S. W. LARRABEE.
Cake Holder and Cooler.

No. 201,538.          Patented March 19, 1878.

WITNESSES.
Chas. E. Hibbard
Geo. H. Carl

INVENTOR.
S. W. Larrabee.
Per Brown Bros
Attorneys

UNITED STATES PATENT OFFICE.

SAMUEL W. LARRABEE, OF SALEM, MASSACHUSETTS.

IMPROVEMENT IN CAKE HOLDER AND COOLER.

Specification forming part of Letters Patent No. 201,538, dated March 19, 1878; application filed January 16, 1878.

*To all whom it may concern:*

Be it known that I, SAMUEL W. LARRABEE, of Salem, county of Essex, and State of Massachusetts, have invented a certain new and useful Improved Cake Holder and Cooler, of which the following is a specification:

This invention relates to an improved holder or rest on which to place a loaf of cake or bread, &c., to cool when removed from the baking-oven; and its construction and arrangement are such that air can as readily pass to and reach the bottom of the cake which rests on the holder as to the top or sides, as hereinafter particularly described, and also that the bottom of the cake will not be injured by the sticking of the same to the holder, as is often the case with the present mode of cooling cake, &c.

Figure 1:
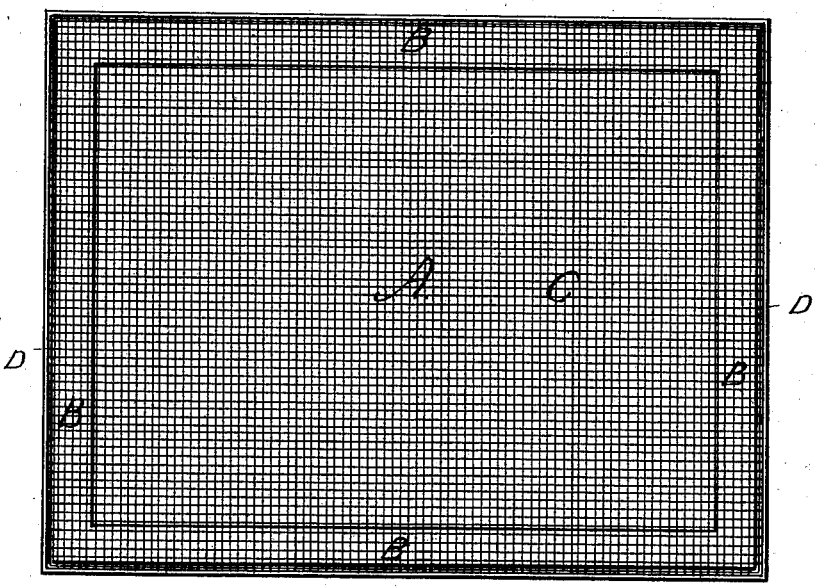
Figure 2:
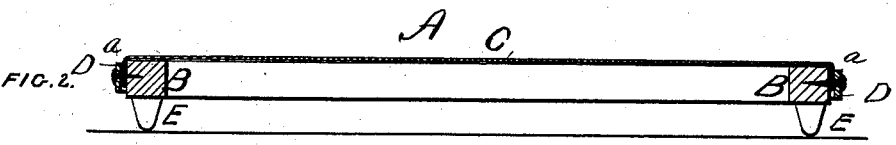
Figure 3:
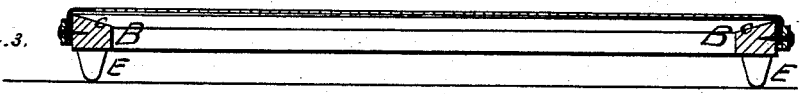

In the accompanying plate of drawings, my invention is illustrated, Figure 1 being a plan view, and Figs. 2 and 3 vertical sections.

A in the drawings represents my improved holder or rest, on which to place a loaf of cake or bread, &c., to be cooled after baking it. This holder or rest A is constructed of a frame, B, of rectangular shape, made of flat strips of wood. On this frame B is placed a wire-gauze, C, which extends over the whole upper surface of the frame and its edges *a*, and is there secured by strips of tin D, tacked to the edges *a*. This wire-gauze C is made of fine wire, and the meshes are coarse and open enough for the proper use of the holder, and yet close enough, in the use of quite fine wire, to give sufficient strength for the gauze to sustain the loaf of cake, &c., and be durable.

On the under side of the frame B, at each of its four corners, are legs E, which serve to keep the holder from the table, &c., on which it rests, and thereby allow a free circulation of air to pass under the holder.

The openings or meshes of the wire-gauze allow the air, in its circulation under the holder, to pass freely to the bottom of the cake, thus cooling the bottom equally as well and as quickly as the top or sides of the cake; and as, in the use of fine wire for the gauze, an exceedingly small portion of the surface of the bottom of the cake comes in contact with the gauze, sticking of the cake thereto, thereby causing its injury, is prevented.

The frame can be cut away, as shown at *c* in Fig. 3, so that no portion of the gauze on which the cake rests will touch or lie upon the frame; and larger wire can be used, if desired, although fine wire is preferable.

I am aware that a bake-pan has been constructed of a frame of perforated metal, supported by suitable legs. Such, therefore, I disclaim.

Having thus described my invention, what I claim, and desire to secure by Letters Patent, is—

As a new article of manufacture, a cake or bread cooler, consisting of a wooden frame supporting a screen of wire-gauze, which is attached to the edges thereof, said frame being provided with feet or legs for supporting it, so that a fresh-air passage will be secured under the said screen, substantially as described.

SAMUEL W. LARRABEE.

Witnesses:
 EDWIN W. BROWN,
 GEO. H. EARL.